US012522465B2

(12) United States Patent
Capoia

(10) Patent No.: US 12,522,465 B2

(45) Date of Patent: Jan. 13, 2026

(54) SYSTEM AND A METHOD FOR STACKING A FANFOLDED CONTINUOUS WEB OF SHEET MATERIAL

(71) Applicant: International Boxes S.r.l., Cimadolmo (IT)

(72) Inventor: Giuseppe Capoia, Cimadolmo (IT)

(73) Assignee: Panotec S.r.l., Cimadolmo (IT)

( * ) Notice: Subject to any disclaimer, the term of this patent is extended or adjusted under 35 U.S.C. 154(b) by 187 days.

(21) Appl. No.: 18/561,196

(22) PCT Filed: May 19, 2022

(86) PCT No.: PCT/IB2022/054672

§ 371 (c)(1),
(2) Date: Nov. 15, 2023

(87) PCT Pub. No.: WO2022/243924

PCT Pub. Date: Nov. 24, 2022

(65) Prior Publication Data

US 2024/0253941 A1 Aug. 1, 2024

(30) Foreign Application Priority Data

May 19, 2021 (IT) ........................ 102021000012929

(51) Int. Cl.
*B65H 45/10* (2006.01)
*B26D 1/24* (2006.01)
(Continued)

(52) U.S. Cl.
CPC ......... *B65H 45/1015* (2013.01); *B26D 1/245* (2013.01); *B65H 31/10* (2013.01);
(Continued)

(58) Field of Classification Search
CPC .......... B26D 1/08; B26D 1/085; B26D 1/245; B31F 1/08; B65H 31/10; B65H 31/30;
(Continued)

(56) References Cited

U.S. PATENT DOCUMENTS 7,402,130 B1 7/2008 Bjostedt
9,004,480 B2 * 4/2015 Hsu ........................ B65H 45/24 270/39.02
(Continued)

FOREIGN PATENT DOCUMENTS

JP S4931775 3/1974
WO 2013132325 9/2013

*Primary Examiner* — Leslie A Nicholson, III
(74) *Attorney, Agent, or Firm* — Themis Law

(57) ABSTRACT

A system for stacking a fanfolded continuous web of sheet material of indefinite length, such as corrugated cardboard, includes a feeding device that guides the continuous web longitudinally, a creasing device downstream of the feeding device to form transverse creases on the continuous web with a constant longitudinal pitch to define a succession of adjacent partitions, a folding device downstream of the creasing device for progressively and alternately fanfolding adjacent partitions along the creases, and a collection device for collecting the folded web. The collection device includes a vertical column for retaining the stack of fanfolded adjacent partitions, and a cutting unit is mounted at the top of the column to act on the fly on the top adjacent partition of the stack while tracking stack-formation without stopping the folding device. A method of stacking a sheet material, such as a fanfolded continuous web of corrugated cardboard of indefinite length.

10 Claims, 7 Drawing Sheets

(51) Int. Cl.
*B65H 31/10* (2006.01)
*B65H 31/30* (2006.01)
*B65H 35/06* (2006.01)
*B65H 45/101* (2006.01)

(52) U.S. Cl.
CPC ......... *B65H 31/3054* (2013.01); *B65H 35/06* (2013.01); *B65H 2301/11* (2013.01); *B65H 2301/51512* (2013.01); *B65H 2701/1762* (2013.01)

(58) Field of Classification Search
CPC ............... B65H 31/32; B65H 31/3054; B65H 2301/11; B65H 2301/51512; B65H 2701/1924; B65H 2701/1762
USPC ............................................ 270/39.01, 39.05
See application file for complete search history.

(56) References Cited

U.S. PATENT DOCUMENTS

| | | | | |
|---|---|---|---|---|
| 9,216,877 | B2 * | 12/2015 | Grünwald | B65H 31/32 |
| 12,202,697 | B2 * | 1/2025 | Capoia | B65H 45/107 |
| 2012/0021886 | A1 | 1/2012 | Gruenwald | |

* cited by examiner

SYSTEM AND A METHOD FOR STACKING A FANFOLDED CONTINUOUS WEB OF SHEET MATERIAL

FIELD OF THE INVENTION

The present invention generally finds application in the field of packaging and particularly relates to a system for stacking a fanfolded continuous web of sheet material of indefinite length.

The invention also relates to a method of stacking a fanfolded continuous web of corrugated cardboard of indefinite length.

BACKGROUND ART

Sheet materials, typically corrugated cardboard, have been long known to be used in box package production in the form of a web of sheet material that is folded into a fan-fold arrangement to reduce bulk and facilitate handling.

In fact, the raw sheet material is initially provided as a continuous web, like the continuous forms of old dot-matrix printers, i.e., consisting of a continuous sheet material of indefinite length composed of a succession of adjacent portions or sections of equal size, known as partitions, delimited by fold lines and alternately folded one on top of the other to form a stack of superimposed partitions.

The stacks of equal or different sizes are loaded into the magazines of an automatic or semi-automatic machine or plant for manufacturing boxes of desired sizes.

In order to obtain a stack, the continuous web initially undergoes a process of forming fold lines transverse to the longitudinal direction of the continuous web, normally by means of a creaser with at least two opposed pressing rollers for forming creases on the two sides of the continuous web that divide adjacent partitions, as described for example in JPS4931775 or US2012/021886.

Once the fold lines or creases have been formed, the web undergoes a fanfolding step, i.e., alternate folding of adjacent partitions one on top of the other, followed by a step of stacking in a final unloading unit and cutting to a desired or standard height, as described for example in WO2013/132325 or U.S. Pat. No. 7,402,130.

Then, the fanfold stacks of sheet material are loaded into one or more storage magazines of a cutting and creasing machine from which the partitions are successively deployed and carried to feed the cutting and creasing units which will form single pieces (blankets) to be assembled into boxes.

DE102012020943 discloses an apparatus for folding and stacking a continuous web into flat partitions which has a feeding device for feeding a strip of sheet and a number of support elements which are guided along an annular guide for supporting the strip at the fold lines.

Furthermore, the support elements have an individual actuation control and can be displaced perpendicular to the direction of feed of the continuous web.

In particular, the continuous web has a horizontal orientation relative to the feeding device and is stacked horizontally on top of a conveyor belt which is adapted to temporarily support the stack of fanfolded sheet material and move it off the apparatus.

One drawback of this known system is that the fold lines are formed on one side only of the strip and the support elements always support the strip from the bottom. This may cause the formation of press creases in the strip also due to continuous changes of the feeding speed of the support elements.

Furthermore, the support elements project in cantilever fashion and laterally retract laterally to slide out of the fold lines and at this time the feeding speed decreases, thereby strongly affecting the working speed of the entire device.

One more drawback of this known system is that, once the continuous web has been folded, the conveyor belt supports the stack only along one side of the stack and along a single series of fold lines, which may cause the stack to be deformed under its own weight and further press creases to be formed.

EP2409939 discloses a folding device equipped with a guided latch member for displacing a corrugated cardboard web at a fold. Further latch members are guided independently of the former latch member to carry along the corrugated cardboard web at another fold, which is arranged upstream of the former fold.

Also, a collection device is arranged downstream of a folding device for stacking the corrugated cardboard web, which is folded along the folds to form stacks.

One drawback of this known folding device is that once again the latch members operate on the cardboard web on one side only at one every two fold lines and cannot avoid the formation of press creases in the vicinity of the first latch member.

Furthermore, the feeding speed is limited by the complexity of the mechanism for moving the independent latch members elements, which are driven by annular belts or chains.

A further drawback is that each time the stack has to be cut in the collection device, the feeding speed of the continuous web decreases to allow the partition to be cut higher than the stack.

Technical Problem

In the light of the prior art, the technical problem addressed by the present invention consists in allowing the continuous web to be cut to form stacks, while avoiding the formation of press creases and without slowing down or stopping the folding device.

DISCLOSURE OF THE INVENTION

The object of the present invention is to obviate the above discussed drawback, by providing a system and a method for stacking a fanfolded continuous web of sheet material of indefinite length, such as corrugated cardboard, that are highly efficient and cost-effective.

A particular object of the present invention is to provide a system as discussed above that can minimize the formation of press creases near the fold lines and avoid the need to slow down or stop the folding device.

Another object of the present invention is to provide a system as discussed above that can afford high-speed stacking of the continuous web without limitations in cutting the uppermost partition in the stack.

A further object of the present invention is to provide a system as discussed above that can be easily adapted to continuous webs of different widths.

Another object of the present invention is to provide a system as discussed above that can vertically align both sides of the stack.

These and other objects, as more clearly explained hereafter, are fulfilled by a system for stacking a fanfolded continuous web of sheet material of indefinite length, such as corrugated cardboard, as defined in claim 1.

The system comprises a feeding device having means for guiding the continuous web in a longitudinal direction, a creasing device located downstream of the feeding device to form transverse creases on the continuous web spaced apart at a constant longitudinal pitch to define a succession of adjacent partitions, a folding device located downstream of the creasing device to progressively and alternately fanfold adjacent partitions along the creases.

A collection device is also provided for collecting the web folded into stacked adjacent partitions, which comprises a vertically-extending column for retaining the stack of adjacent fanfolded partitions.

According to a peculiar aspect of the invention, a dynamic cutting unit is mounted at the top of the column, to act on the fly on the top adjacent partition of the stack while tracking stack-formation without stopping the folding device.

Due to this on-the-fly cutting operation of the cutting unit, the stack formation process may be tracked while the substantially horizontal plane on which the continuous web is laid above the stack remains unchanged, thereby avoiding the need to slow down or stop the folding device.

Advantageously, the column is equipped with a first stack-supporting rack and a second stack-supporting rack as well as a stack unloading unit mounted thereto on respective lifting carriages that are designed to move vertically along the column, and the cutting unit is mounted to a transverse end of the first supporting rack and is movable along substantially horizontal transverse guide means.

Furthermore, the cutting unit comprises a blade, a counter-blade and motorized drive means of belt and pulley type which are adapted to simultaneously move the cutting blade about its own axis and the transverse moving carriage of the cutting unit.

With this arrangement the uppermost adjacent partition of the stack may be acted upon to be cut while it moves vertically during stacking, thereby avoiding the formation of press creases and the need to slow down or stop the folding device.

The invention also relates to a method of stacking a sheet material, such as a fanfolded continuous web of corrugated cardboard of indefinite length according to the invention.

Advantageous embodiments of the invention are as defined in the dependent claims.

BRIEF DESCRIPTION OF THE DRAWINGS

Further features and advantages of the invention will be more apparent from the detailed description of a system for stacking a fanfolded continuous web of sheet material of indefinite length, such as corrugated cardboard, which is described as a non-limiting example with the help of the annexed drawings, in which.

DETAILED DESCRIPTION OF A PREFERRED EXEMPLARY EMBODIMENT

Figure 1:
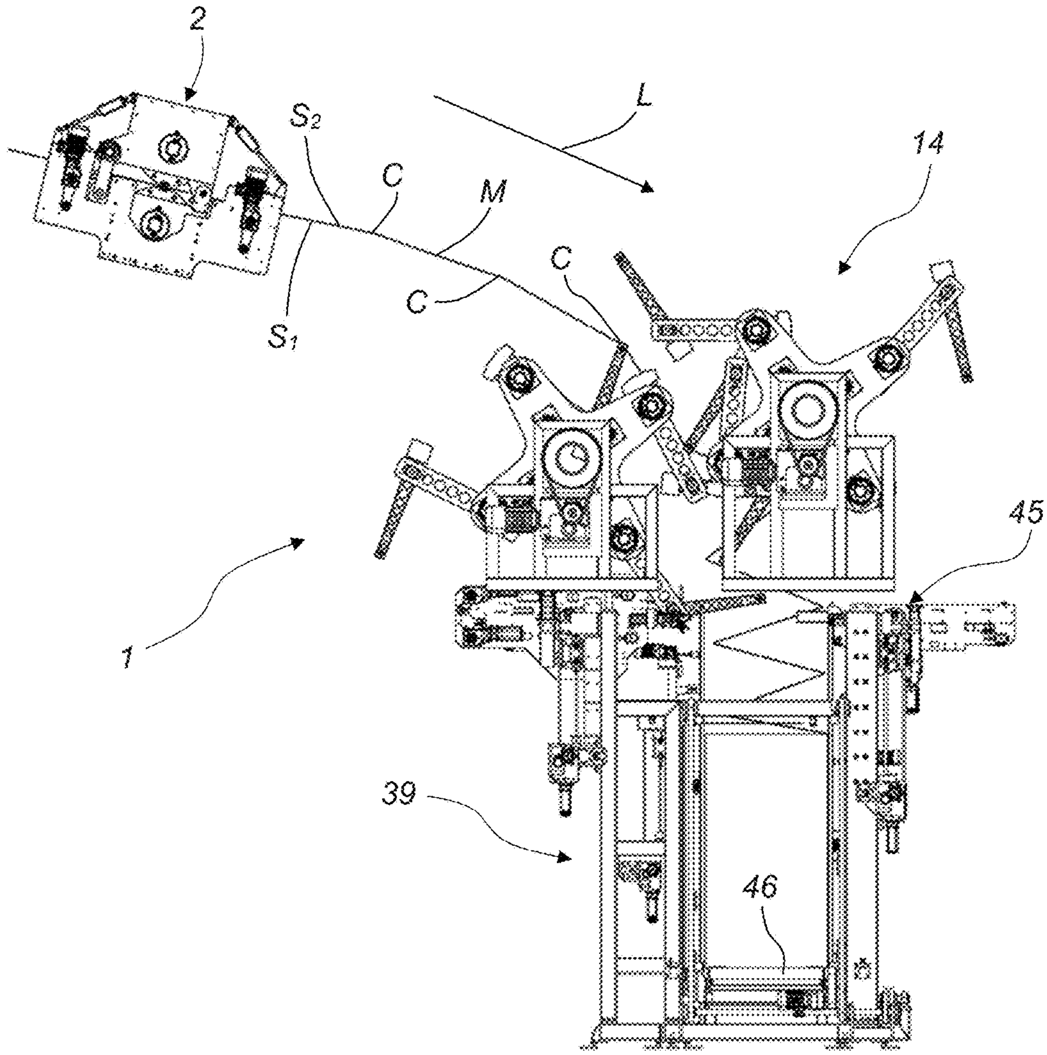
FIGS. 1, 2 and 3 are a side view, a top view and a perspective view of the system of the invention respectively.
Figure 2:
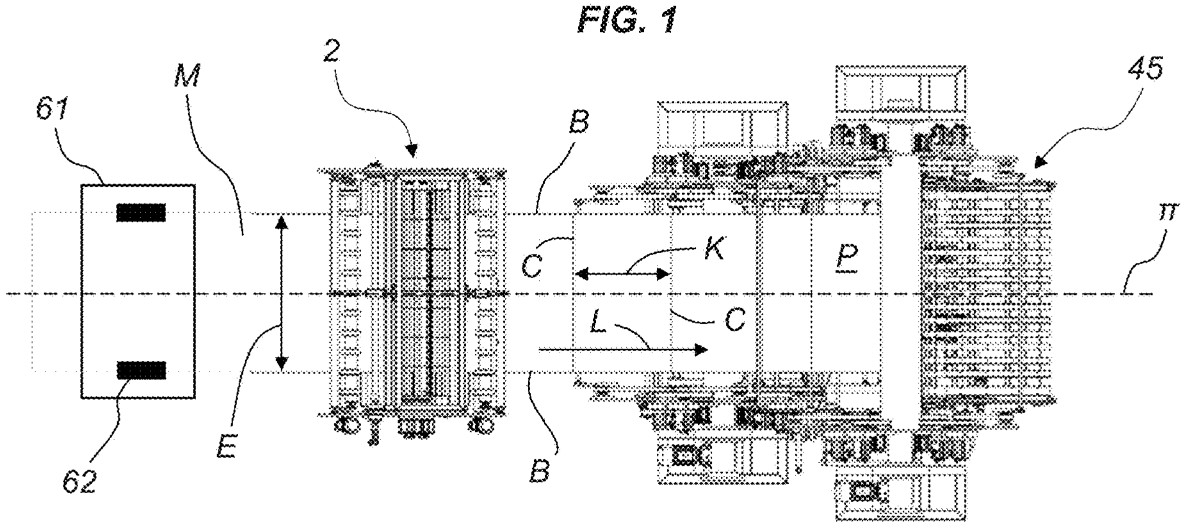
Figure 3:
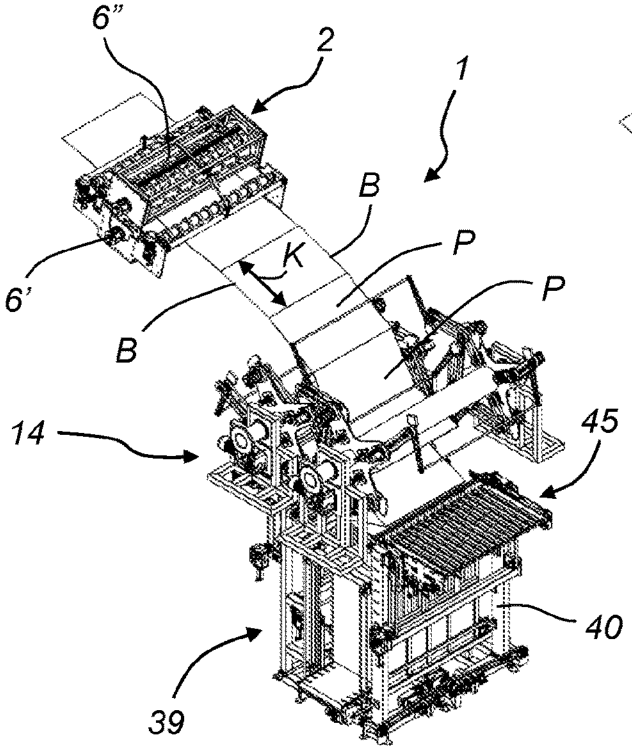
Figure 4:
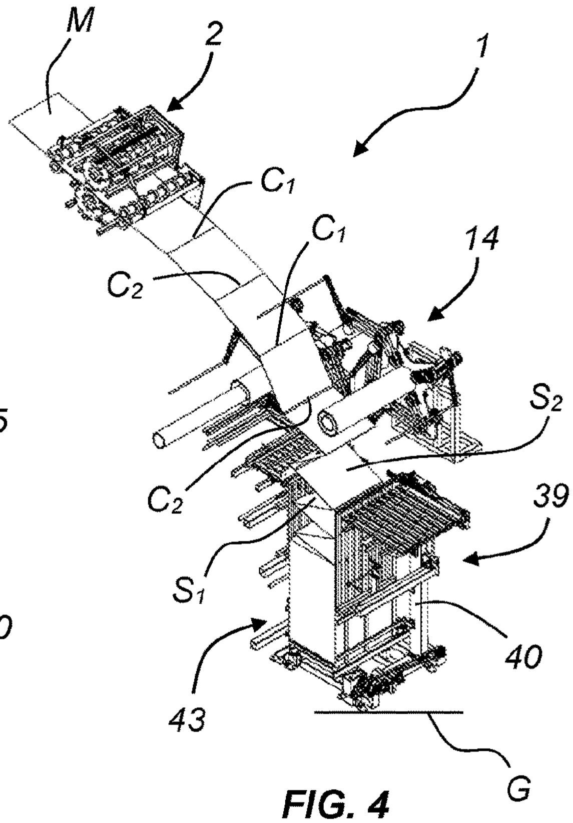
FIG. 4 is a cross-sectional view of the system of FIG. 3.
Figure 5:
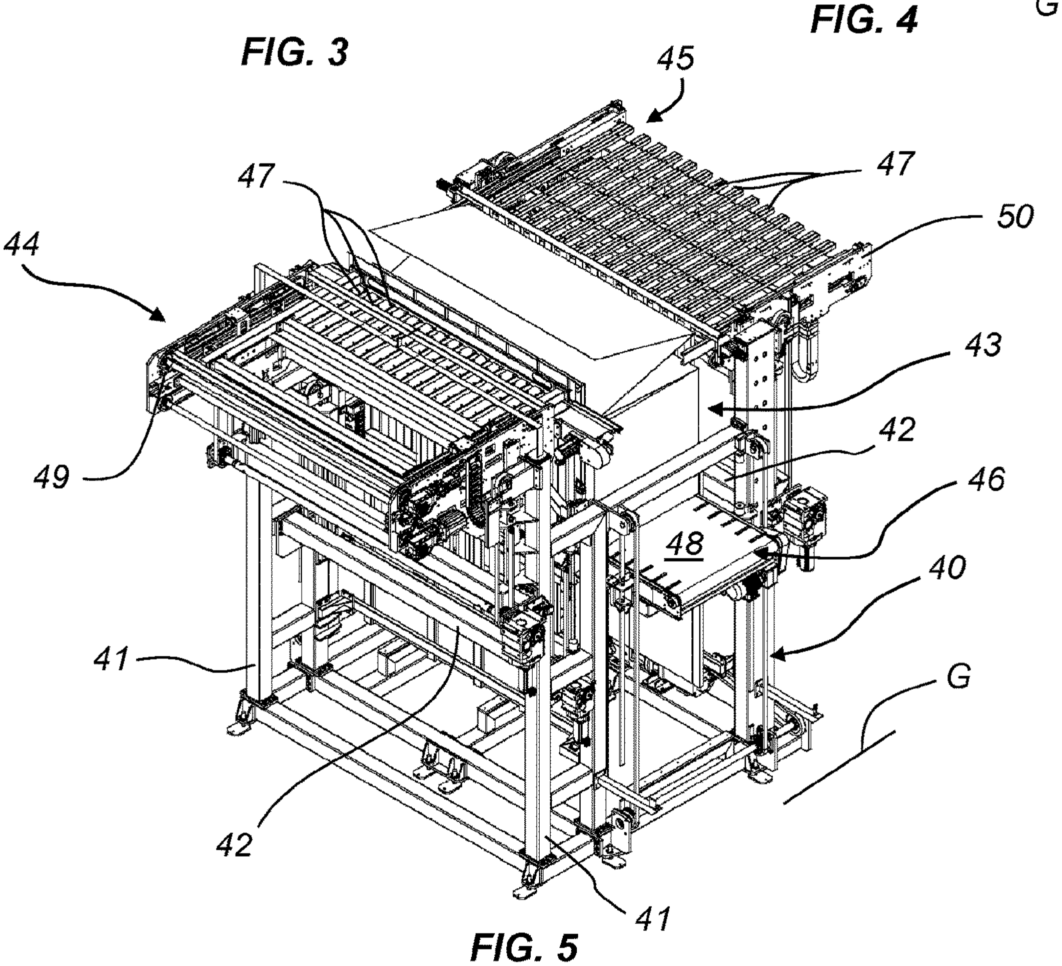
FIG. 5 is a perspective view of the collection device of the system of FIG. 1.
Figure 6:
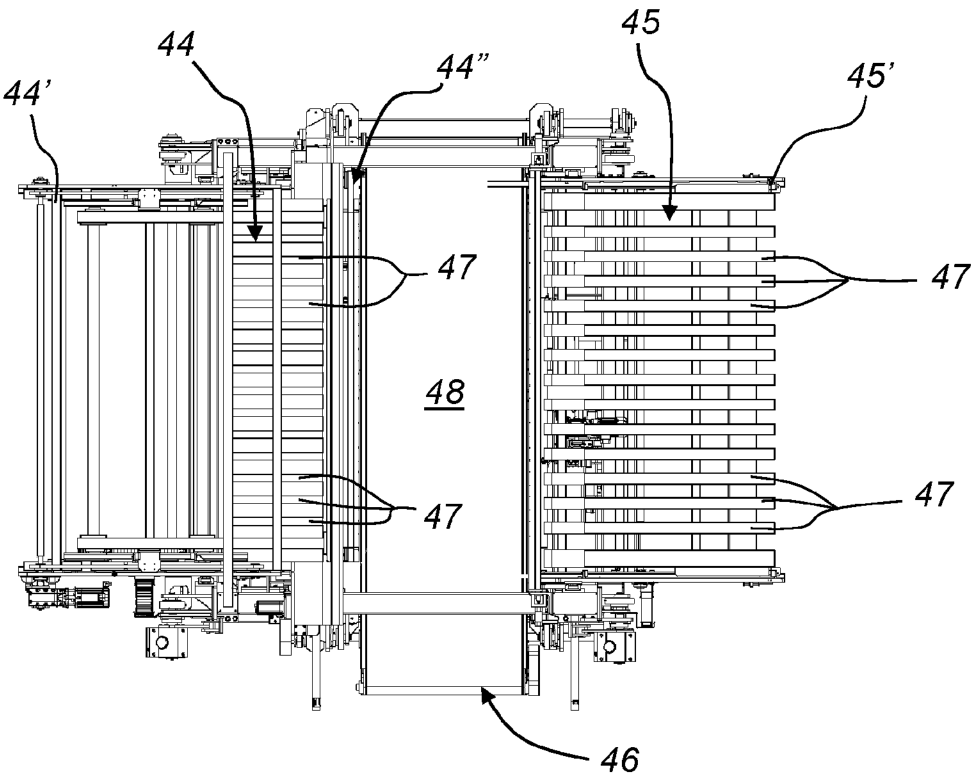
FIGS. 6 and 7 are a top view and a side view of the collection device of FIG. 5 respectively.
Figure 7:
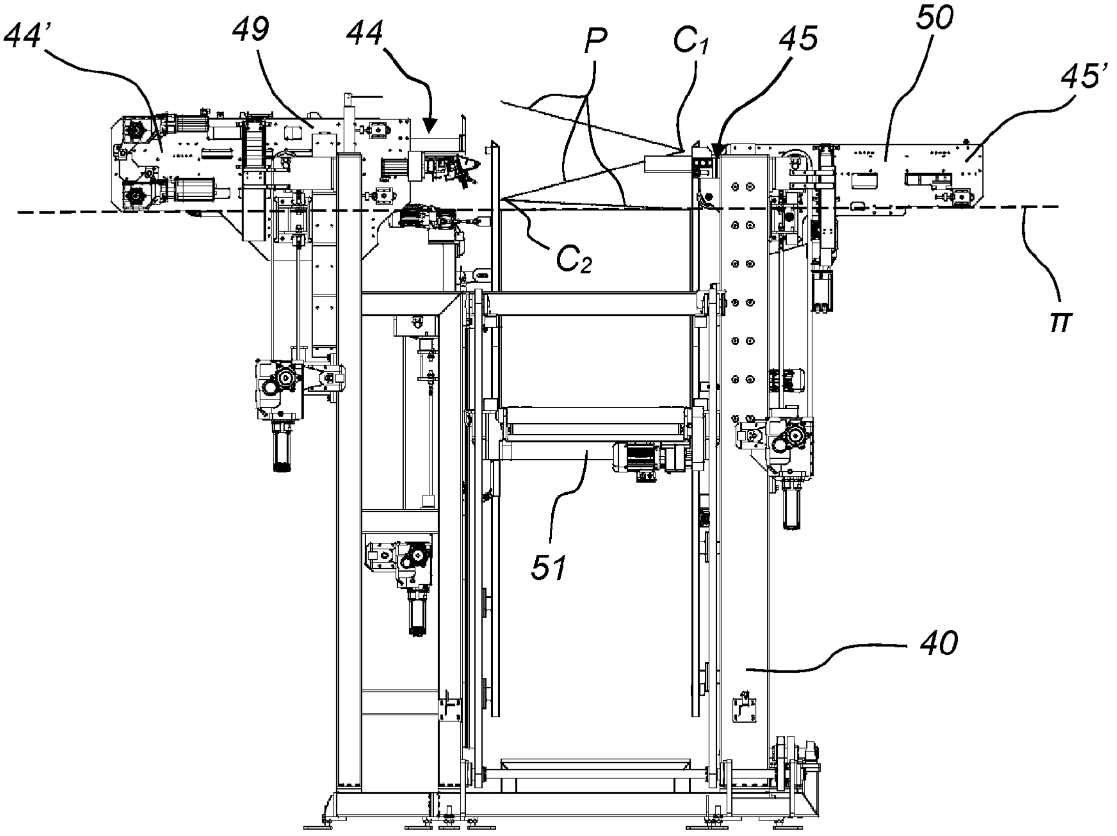

Particularly referring to the figures, there is shown a system, generally designated by numeral 1, for stacking a fanfolded continuous web M of sheet material of indefinite length, such as corrugated cardboard.

As is known per se, the continuous web M is substantially longitudinal, has a bottom side $S_1$, a top side $S_2$, longitudinal side edges B and comprises a predetermined maximum width E defined by the distance of the longitudinal side edges B.

As best shown in FIGS. 1 to 4, the system 1 comprises a frame defining a vertical center plane $\pi$ and a feeding device 61 having means 62 for guiding the continuous web M along a longitudinal direction L parallel to the vertical center plane $\pi$.

A creasing device 2 is also provided downstream of the feeding device and is adapted to form transverse creases C on the continuous web M spaced apart at a constant longitudinal pitch K to define a succession of adjacent partitions P.

The creasing device 2 may comprise two creasing rollers 6', 6" having tools configured to form creases C alternately on the bottom side $S_1$ and on the top side $S_2$ of the continuous web M for forming "Z" folds.

Therefore, at the output of the creasing device 2, the web M will alternately and successively comprise a crease $C_1$ formed on the bottom side $S_1$, for folding the web M upwards, and a crease $C_2$ formed on the top side $S_2$, for folding the web M downwards.

Conveniently, the system 1 comprises a folding device 14 located downstream of the creasing device 2 for progressively and alternately fanfolding adjacent partitions P along the creases C.

As best shown in the figures, downstream of the folding device 14, the system 1 comprises a collection device 39 for collecting the folded web M to stack adjacent partitions P.

The collection device 39 comprises a vertically-extending column 40 for retaining the stack of adjacent partitions P that have been fanfolded by the folding device 14.

The column 40 comprises a plurality of uprights 41 anchored to the ground G and a plurality of cross members 42 which are adapted to stiffen the column 40 and create a compartment 43 for retaining the stack.

As best shown in FIGS. 5-8, a first stack-supporting rack 44, a second stack-supporting rack 45 and a stack unloading unit 46 are mounted to the column 40.

In particular, the first supporting rack 44 and the second supporting rack 45 comprise a plurality of arms 47, which are transversely offset with a predetermined pitch, and the unloading unit 46 comprises a closed-loop conveyor belt 48 for temporarily supporting the stack and moving it transversely off the column 40.

Furthermore, the first supporting rack 44 and the second supporting rack 45 are mounted to a first lifting carriage 49 and a second lifting carriage 50 respectively, which are vertically movable along the column 40, and the lifting carriages 49, 50 are mounted to a first transverse end 44', 45' of the first supporting rack 44 and the second supporting rack 45.

Likewise, the unloading unit 46 is mounted to a third lifting carriage 51 which is vertically movable along the vertical column 40 to allow the unloading unit 46 to move down as the stack is being formed, with the substantially horizontal plane Q on which the continuous web M is laid above the stack remaining unchanged, as best shown in FIGS. 10-17.

Of course, appropriate vertical sliding means, not shown, are mounted along the vertical extent of the column 40, for vertical and independent movement of the lifting carriages 49, 50, 51.

According to a peculiar aspect of the invention, a dynamic cutting unit 52 is mounted at the top of the column 40, to act on the fly on the top adjacent partition P of the stack while tracking stack-formation without stopping the folding device 14.

Thus, a plurality of stacks may be obtained from the continuous web M without slowing down or stopping the creasing device 2 and/or the folding device 14, as further described below.

Figure 8:
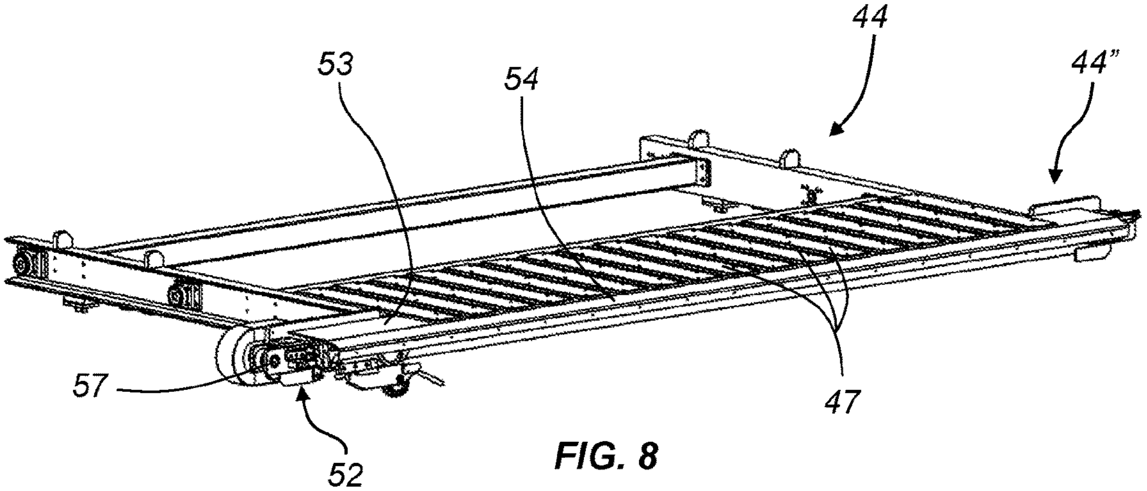
FIGS. 8 and 9 are a perspective view and an enlarged view of a detail of the collection device of FIG. 5 respectively.
Figure 9:
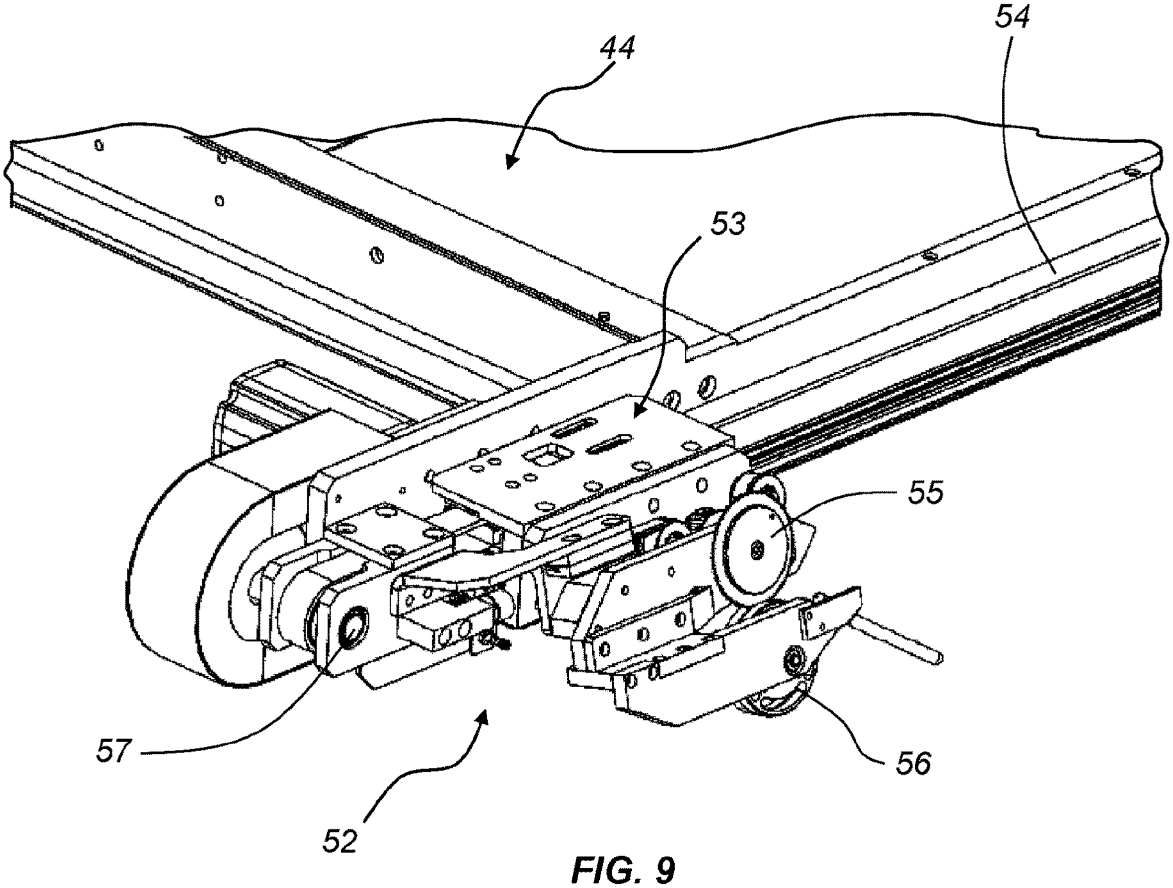
Figure 10:
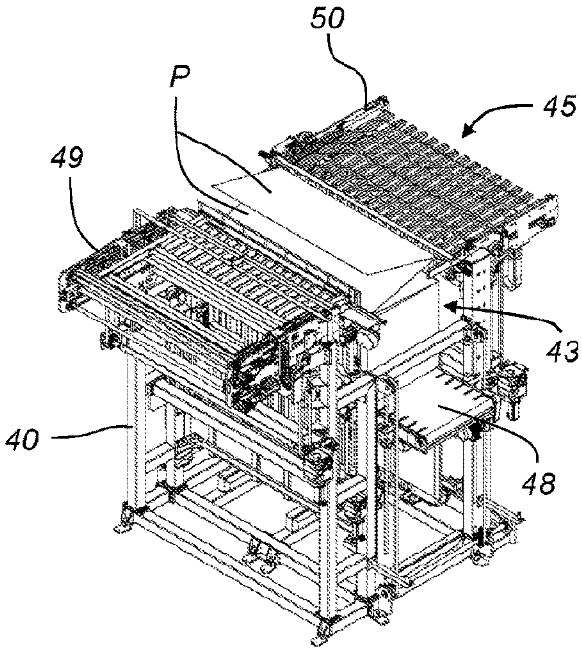
FIGS. 10 to 21 are perspective and side views of the device of FIG. 5 in different steps of operation.
Figure 11:
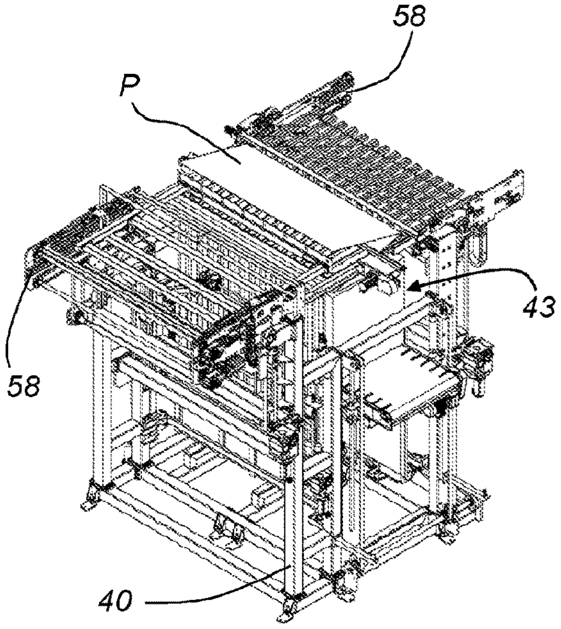
Figure 12:
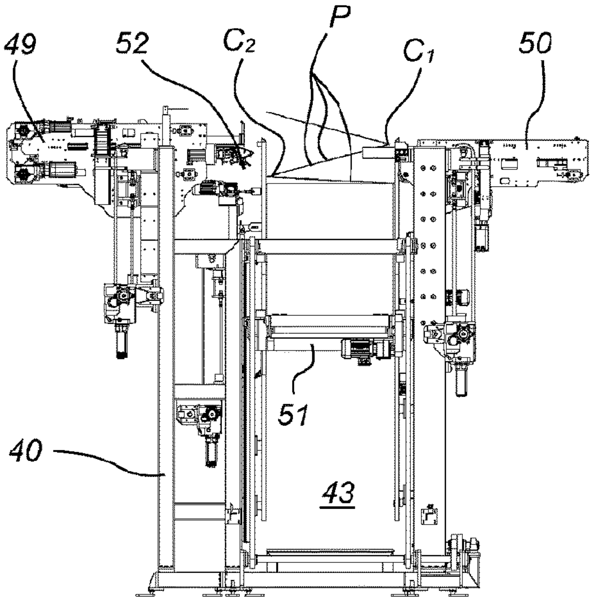
Figure 13:
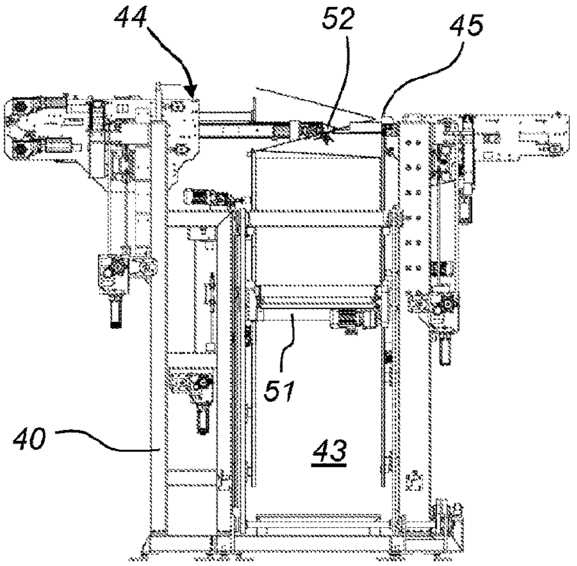
Figure 14:
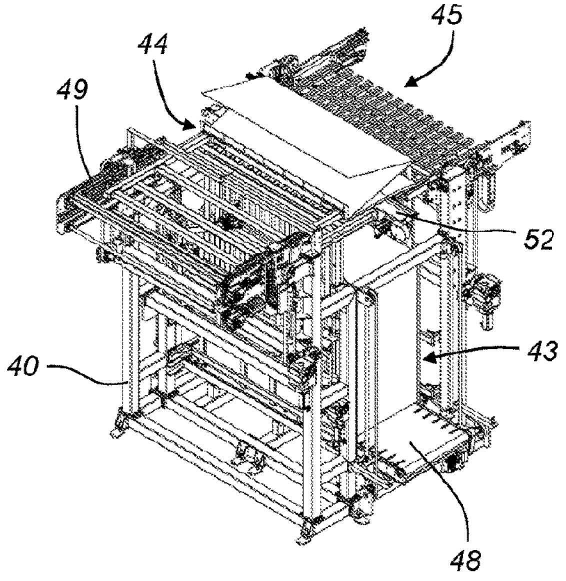
Figure 15:
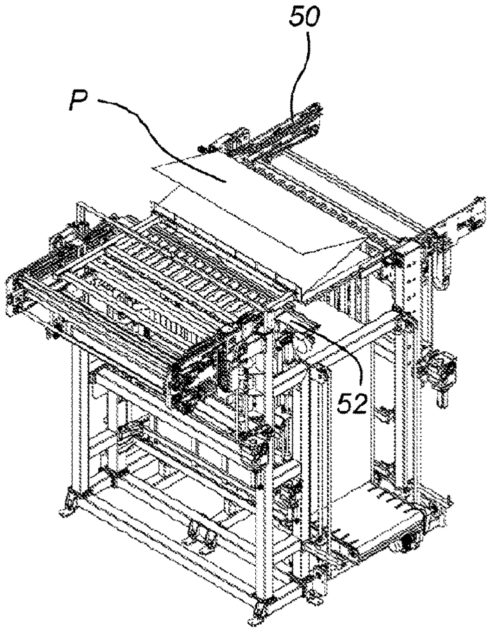
Figure 16:
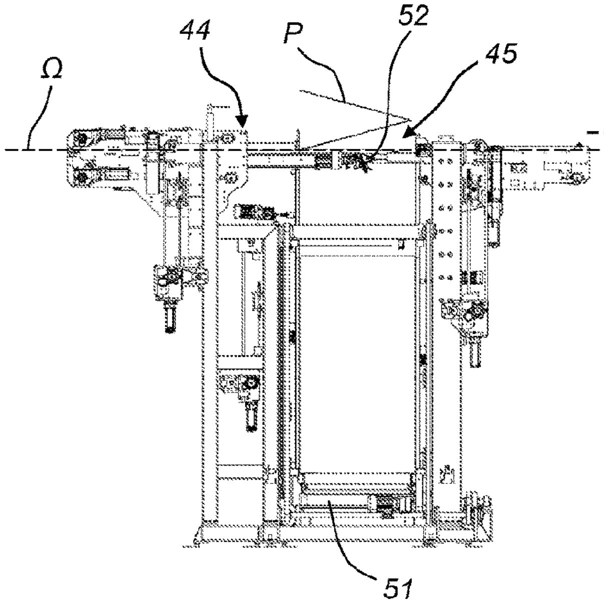
Figure 17:
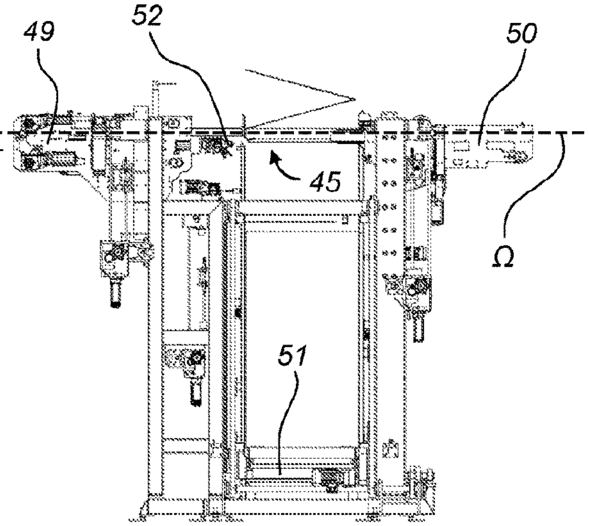
Figure 18:
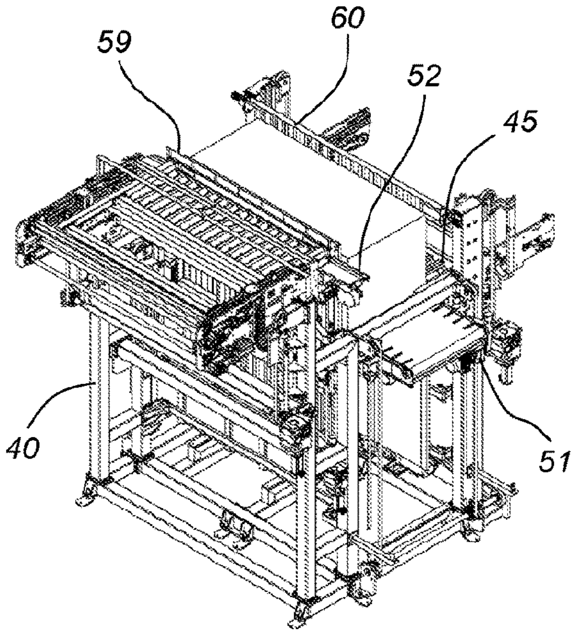
Figure 19:
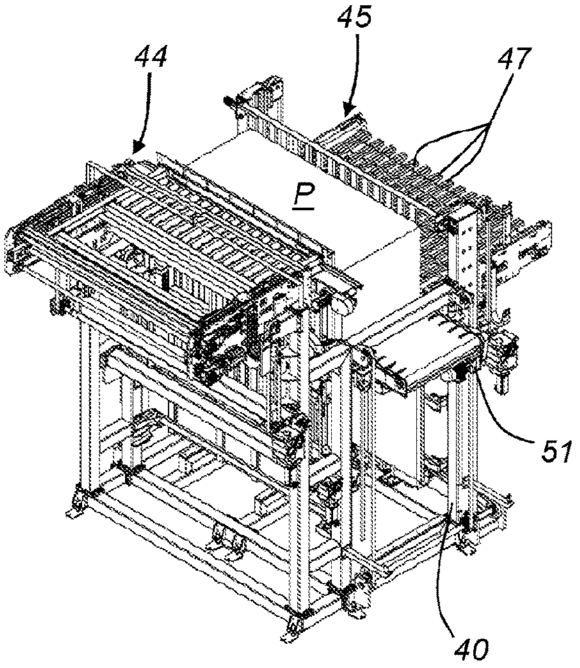
Figure 20:
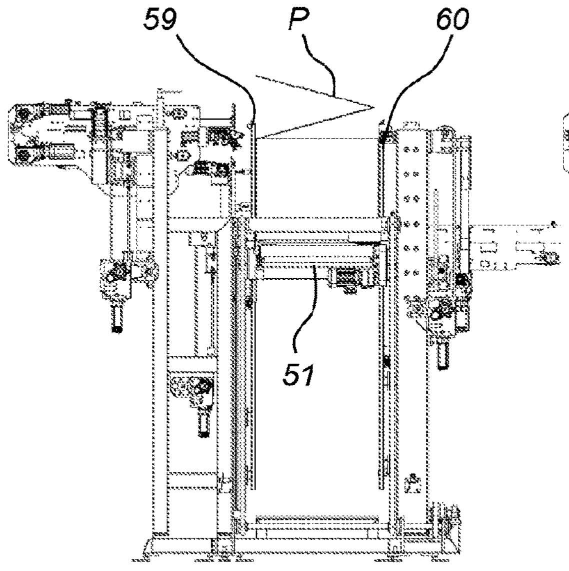
Figure 21:
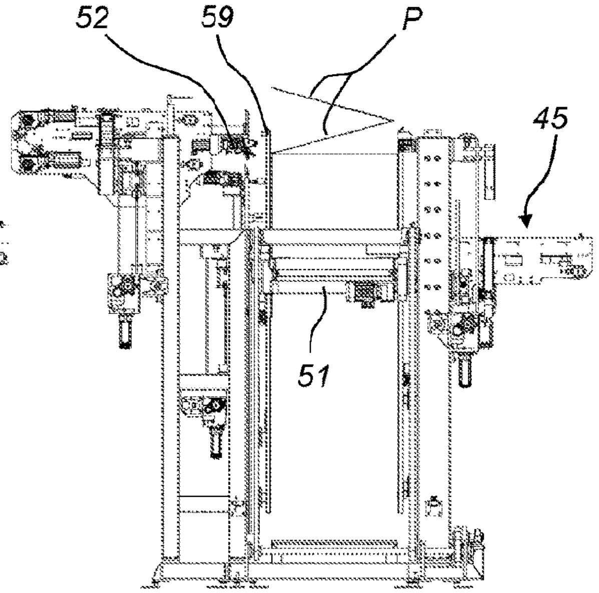

As best shown in FIGS. 8 and 9, the dynamic cutting unit 52 is mounted to a second transverse end 44" of the first supporting rack 44 facing the stack and comprises a fourth carriage 53 that is designed to move along substantially horizontal transverse guide means 54.

The cutting unit 52 comprises a circular cutting blade 55 facing a counter-blade 56 for cutting the continuous web M, the blades being inclined to a predetermined angle to enable the adjacent top partition P of the stack to be intercepted to be cut.

Furthermore, motorized drive means 57 of the belt and pulley type are provided to simultaneously move the cutting blade 55 about its own axis and the fourth carriage 53 along the transverse guide means 54.

As shown in FIGS. 10-17, in order to facilitate stack tracking, the first lifting carriage 49 and the second lifting carriage 50 comprise respective substantially longitudinal guide means 58 for selectively moving the first supporting rack 44 and second supporting rack 45 toward the stack to temporarily support it once the adjacent partition P has been cut.

Then, the continuous web M is cut on the fly immediately before the first carriage 44 and the second carriage 45 are moved toward the retaining compartment 43 to support the stack being formed.

As best shown in FIGS. 14-21, the stack that has just been cut is supported by the supporting racks 44, 45 by tracking the formation of the stack while keeping the plane Ω on which the continuous web M is kept unchanged for the time required for the unloading unit 46 to unload the previous stack outside the column 40 and to climb up the corresponding vertical sliding means to collect the stack.

Then, the first supporting rack 44 and the second supporting rack 45 move away from the retaining compartment 43 along the longitudinal guide means 58 to unload the stack onto the unloading unit 46.

In addition, to facilitate alignment of the creases $C_1$, $C_2$ of each stack, the column 40 comprises first 59 and second substantially vertical leveling plates 60 for vertically aligning the creases $C_2$ of the top side $S_2$ and the creases $C_1$ of the bottom side $S_1$ respectively.

Preferably, before unloading the stack being formed on the unloading unit 46, the first supporting rack 44 is removed from the stack while the second supporting rack 45 is pushed away toward the first supporting rack 44 and while the stack is being kept horizontally motionless by the leveling plates 59, 60, as shown in FIGS. 14-17.

In a further aspect, the invention relates to a method of stacking a sheet material, such as a fanfolded continuous web M of corrugated cardboard of indefinite length having a bottom side $S_1$, a top side $S_2$ and longitudinal side edges B.

The method comprises the steps of:

providing the feeding device for feeding the continuous web M in a longitudinal direction L;

providing the creasing device 2 downstream of the feeding device to form transverse creases C on the continuous web M spaced apart at a constant longitudinal pitch K and defining the adjacent partitions P;

providing the folding device 14 downstream of the creasing device 2 for progressively and alternately fanfolding adjacent partitions P along the creases C;

providing a collection device 39 downstream of the folding device 14 for collecting the folded web M and forming a stack of superimposed adjacent partitions P;

providing a vertically-extending column 40 in the collection device 39 for retaining the stack of fanfolded adjacent partitions P;

providing the first stack-supporting rack 44 and the second stack-supporting rack 45, the stack unloading unit 46 and the dynamic cutting unit 52 for cutting at least one adjacent partition P of the stack, in the collection device 39;

forming creases $C_1$, $C_2$ by the creasing device 2, alternately on the bottom side $S_1$ and the top side $S_2$ of the continuous web M;

actuating the folding device 14;

moving the first supporting rack 44 and second supporting rack 45 horizontally toward the stack and vertically toward the stack unloading unit 46, thereby tracking the formation of the stack without stopping the folding device 14;

actuating the dynamic cutting unit 52 on the fly and causing it to interact with the uppermost adjacent partition P in the stack thereby avoiding the need to stop the folding device 14;

depositing the stack in the unloading unit 46.

II will be appreciated from the above that the system for stacking a fanfolded continuous web of sheet material and the method of operation according to the invention fulfill the intended objects, and namely afford the formation of stacks without press creases and without slowing down or stopping the folding device.

The system and method of operation of the invention are susceptible to a number of changes and variants within the inventive concept as disclosed in the annexed claims.

While the system and method of operation have been described with particular reference to the accompanying figures, the numerals referred to in the disclosure and claims are only used for the sake of a better intelligibility of the invention and shall not be intended to limit the claimed scope in any manner.

Reference herein to "one embodiment" or "the embodiment" or "some embodiments" indicates that a particular characteristic, structure or element that is being described is included in at least one embodiment of the inventive subject matter.

Furthermore, the particular characteristics, structures or elements may be combined together in any suitable manner to provide one or more embodiments.

INDUSTRIAL APPLICABILITY

The present invention may find application in industry, because it can be manufactured on an industrial scale in factories for processing sheet materials into packages.

The invention claimed is:

1. A system (1) for stacking a fanfolded continuous web (M) of sheet material of indefinite length, the system (1) comprising:

- a feeding device configured to guide a continuous web (M) in a longitudinal direction (L);
- a creasing device (2) located downstream of said feeding device to form transverse creases (C) on the continuous web (M) spaced apart at a constant longitudinal pitch (K) to define a succession of adjacent partitions (P);
- a folding device (14) located downstream of the creasing device (2) for progressively and alternately fanfolding the adjacent partitions (P) along the transverse creases (C) and produce a folded web;
- a collection device (39) for collecting the folded web (M) into a stack of adjacent partitions (P);
- wherein said collection device (39) comprises a vertically-extending column (40) for retaining the stack of adjacent partitions (P);
- wherein a dynamic cutting unit (52) is mounted at the top of said vertically-extending column (40), to act on a fly on a top adjacent partition (P) of the stack while tracking stack-formation without stopping the folding device (14); and
- wherein a first stack-supporting rack (44), a second stack-supporting rack (45), and a stack unloading unit (46) are mounted onto said column (40).

2. The system as claimed in claim 1, wherein said first stack-supporting rack (44) and said second stack-supporting rack (45) are mounted to a first lifting carriage (49) and a second lifting carriage (50) respectively, which are vertically movable along said vertically-extending column (40), said first and said second lifting carriage (49, 50) being mounted to a first transverse end (44', 45') of said first stack-supporting rack (44) and said second stack-supporting rack (45).

3. The system as claimed in claim 2, wherein said unloading unit (46) is mounted to a third lifting carriage (51) which is vertically movable along said vertically-extending column (40).

4. The system as claimed in claim 3, wherein said dynamic cutting unit (52) is mounted to a second transverse end (44") of said first stack-supporting rack (44) and comprises a fourth carriage (53), which is configured to move along a substantially horizontal transverse guide (54) and a circular cutting blade (55) facing a counter-blade (56) for cutting the continuous web (M).

5. The system as claimed in claim 4, further comprising a motorized drive (57) of a belt and pulley type, adapted to simultaneously move said cutting blade (55) about its own axis and said fourth carriage (53) along said transverse guide (54).

6. The system as claimed in claim 2, wherein said first lifting carriage (49) and said second lifting carriage (50) comprise respective substantially longitudinal guides (58), which are configured to selectively move said first stack-supporting rack (44) and second stack-supporting rack (45) toward the stack to support the stack temporarily when the adjacent partition (P) has been cut and to track a formation of the stack without stopping the folding device (14).

7. The system as claimed in claim 1, wherein said first stack-supporting rack (44) and said second stack-supporting rack (45) comprise a plurality of arms (47) which are transversely offset by a predetermined pitch.

8. The system as claimed in claim 1, wherein said unloading unit (46) comprises a closed-loop conveyor belt (48), which is adapted to temporarily support the stack and move the stack transversely off said vertically-extending column (40).

9. The system as claimed in claim 1, wherein said creasing device (2) is configured to form creases alternately on a bottom side (Si) and on a top side (S2) of the continuous web (M), said vertically-extending column (40) comprising first (59) and second substantially vertical leveling plates (60) for vertically aligning the creases (Ci) of the bottom face (Si) and the creases (C2) of the top face (S2) respectively.

10. A method of stacking a sheet material, said method comprising the steps of:

- providing a feeding device for feeding a continuous web (M) in a longitudinal direction (L);
- providing a creasing device (2) downstream of said feeding device to form transverse creases (C) on the continuous web (M) spaced apart at a constant longitudinal pitch (K) and to define adjacent partitions (P);
- providing a folding device (14) located downstream of the creasing device (2) for progressively and alternately fanfolding the adjacent partitions (P) along the creases (C);
- providing a collection device (39) downstream of the folding device (14) for collecting the folded web (M) and forming a stack of superimposed adjacent partitions (P);
- providing a vertically-extending column (40) in the collection device (39) for retaining the stack of superimposed adjacent partitions (P);
- providing in said collection device (39) a first stack-supporting rack (44) and a second stack-supporting rack (45), a stack unloading unit (46), and a dynamic cutting unit (52) for cutting at least one adjacent partition (P) of the stack;
- moving said first supporting rack (44) and said second supporting rack (45) horizontally toward the stack and vertically toward the unloading unit (46), thereby tracking a formation of the stack without stopping the folding device (14);
- actuating the dynamic cutting unit (52) on the fly and causing the dynamic cutting unit (52) to interact with an uppermost adjacent partition (P) in the stack, thereby avoiding a need to stop the folding device (14); and
- depositing the stack in the unloading unit (46).

* * * * *